US012469592B2

(12) United States Patent
Sonntag

(10) Patent No.: US 12,469,592 B2
(45) Date of Patent: Nov. 11, 2025

(54) SYSTEM FOR AUTOMATICALLY EVALUATING VIRTUAL PATIENT FITTING OF MEDICAL DEVICES

(71) Applicant: Virtonomy GmbH, Munich (DE)

(72) Inventor: Simon J. Sonntag, Munich (DE)

(73) Assignee: Virtonomy GmbH, Munich (DE)

( * ) Notice: Subject to any disclaimer, the term of this patent is extended or adjusted under 35 U.S.C. 154(b) by 341 days.

(21) Appl. No.: 18/005,910

(22) PCT Filed: Jun. 30, 2021

(86) PCT No.: PCT/EP2021/068036
§ 371 (c)(1),
(2) Date: Jan. 18, 2023

(87) PCT Pub. No.: WO2022/017749
PCT Pub. Date: Jan. 27, 2022

(65) Prior Publication Data
US 2023/0317251 A1    Oct. 5, 2023

(30) Foreign Application Priority Data

Jul. 21, 2020   (EP) .................................... 20187012

(51) Int. Cl.
*G16H 30/40*     (2018.01)
*G06T 7/00*      (2017.01)
(Continued)

(52) U.S. Cl.
CPC .......... *G16H 30/40* (2018.01); *G06T 7/0012* (2013.01); *G06T 7/70* (2017.01); *G16H 50/50* (2018.01); *G06T 2207/30052* (2013.01)

(58) Field of Classification Search
CPC .......... G16H 30/40; G16H 50/50; G06T 7/70; G06T 7/0012; G06T 2207/30052
See application file for complete search history.

(56) References Cited

U.S. PATENT DOCUMENTS

| 10,719,986 B2* | 7/2020 | Zaeuner ................. G06T 19/00 |
| 2004/0153128 A1* | 8/2004 | Suresh .................. G16H 30/20 |
| | | 600/407 |
| 2011/0153286 A1 | 6/2011 | Zaeuner et al. |

FOREIGN PATENT DOCUMENTS

WO    2014195237 A1    12/2014

OTHER PUBLICATIONS

Daanen, Elsevier, 2018, pp. 237-252.*
(Continued)

*Primary Examiner* — Michael I Ezewoko
(74) *Attorney, Agent, or Firm* — Renner, Otto, Boisselle & Sklar, LLP

(57) ABSTRACT

A system for virtually evaluating fit of a medical device in at least one patient comprises means for providing at least one virtual patient model, the virtual patient model being based at least in part on image data retrieved from multiple real patients; means for providing a virtual model of a medical device to be evaluated; means for automatically identifying a medical device location within the at least one virtual patient model; means for aligning the model of the medical device with the at least one virtual patient model at the identified device location; and means for evaluating the fit of the medical device in the at least one virtual patient model by evaluating the fit of the aligned model of the medical device within the at least one virtual patient model.

15 Claims, 6 Drawing Sheets

(51) Int. Cl.
*G06T 7/70* (2017.01)
*G16H 50/50* (2018.01)

(56) References Cited

OTHER PUBLICATIONS

Egger,Elsevier,2011,pp. 183-203.*
Kerrien, Elsevier, 2016, pp. 685-698.*
Lee, Elsevier, 2017, pp. 1-13.*
International Search Report and Written Opinion of the International Searching Authority for corresponding International Patent Application No. PCT/EP2021/068036, dated Sep. 22, 2021.
European Search Report issued for corresponding European Patent Application No. 20187012.8, dated Dec. 1, 2020.

* cited by examiner

SYSTEM FOR AUTOMATICALLY EVALUATING VIRTUAL PATIENT FITTING OF MEDICAL DEVICES

This application is a national phase of International Application No. PCT/EP2021/068036, filed Jun. 30, 2021, which claims priority to European Patent Application No. 20187012.8, filed Jul. 21, 2020, each of which is hereby incorporated herein by reference in its entirety.

FIELD OF THE INVENTION

The present application relates to the field of medical implants, and in particular to the field of designing, validation and/or regulatory evaluation of medical implants. In particular, the present application relates to a system, a method, and a computer program for virtually evaluating the fit of a medical device in at least one patient.

BACKGROUND

When designing, validating and/or evaluating new medical devices, such as medical implants, typically extensive in-vivo and in-vitro clinical testing is required. Those clinical tests are further required to get a regulatory approval for said new medical device. Those tests are both costly (over 40 million US dollars for high risk products, such as artificial heart valves, . . . ) and time-consuming (time-to-market can be up to 10 years). Further, within the last ten years, costs for clinical trials have increased tremendously, leading to a lack of medical innovation.

A possible way for reducing cost and time effort can be virtual testing of medical devices. Those virtual tests can be based on a pool of patient data, stored and gathered in a database. This virtual testing allows for a reduction of the cost and time-to-market. In particular, the design of the medical device can be optimized prior to clinical testing, thereby reducing the number of clinical tests and required design iterations. Further, virtual testing allows for taking into account a high number of patient data, resulting in medical devices that fit to a higher population cohort. All in all, virtual testing can help to accelerate medical innovation and to ensure safe, efficient and cost-effective healthcare.

Currently, there is no system or method available that allows for standardized automated virtual testing. To apply virtual testing, many manual steps are presently required that are prone to failure and prevent virtual test results from being comparable.

Those manual steps include inter alia reconstruction of a virtual patient model from imaging data of a real patient, manually positioning a virtual medical device in the virtual patient model, and making decisions, whether the medical device is suitable for said patient or not. These manual steps are time consuming. Even more time is needed when a medical device is tested on multiple patients, as the steps have to be repeated for each patient.

Further, deciding whether or not a medical device is suitable for said patient is often prone to failure, as it is difficult to determine whether there is enough space in the patient-particularly, as the human body consists largely of elastic tissue. Accordingly, volumes that are considered for receiving a medical implant can change depending on body position and movement. In addition, there exists no intuitive and reliable visualization method that points the user to possible collision volumes between the medical device and the virtual patient.

Virtual patients are generally regarded as computer-based simulations or models that represent a real patient. The virtual patient is typically based on data being retrieved from a patient (e.g., by medical imaging techniques, such as radiography, magnetic resonance imaging, molecular imaging, ultrasound imaging, elastography, photoacoustic imaging, tomography, echocardiography, near-infrared spectroscopy, magnetic particle imaging, and/or the like).

Further, said virtual patients typically represent only a body portion, such as an abdomen, head, leg, or the like of a real patient. Known virtual patients are typically designed to complement clinical decision making or to manufacture patient specific medical devices. For example, a patient-specific virtual patient suffering with a bone fracture can be used to determine which commercially-available medical implant is best suited to treat the fracture, and/or to specifically manufacture a medical implant, such as an osteosynthesis plate, for example, by using solid freeform manufacturing techniques, such as 3D-printing.

However, there is no virtual patient, system or method that provides for automated, reliable and comparable virtual testing of at least one virtual patient and allows for the reduction of the cost and time required for designing medical devices.

Generally, it is an object of the present invention to improve the design process and validation of medical devices, more particularly to reduce the number of clinical tests, or even replace clinical tests and to reduce the number of required design iterations.

Further, it is an object of the present invention to provide a system and/or a method that allows for deciding how many percentages of a target population a medical device can fit into, i.e. to provide a population-based virtual fitting analysis. This would further improve the design and validation process of medical devices.

SUMMARY

This object is achieved, at least in part, by a system, a method, and a computer program as defined in the independent claims.

Particularly, the object is achieved by a system for virtually evaluating the fit of a medical device in at least one patient. The system comprises means for providing at least one virtual patient model, wherein the virtual patient model is based at least in part on image data retrieved from at least one real patient.

Generally, a virtual patient (virtual patient model) is a computer-based simulation or model that represents a real patient (patient specific virtual patient) or a group of patients (representative virtual patient). In the first case, the virtual patient is based on data being retrieved from a single patient. This data may be amended and/or modified after being retrieved to form the virtual patient. In the second case, the virtual patient is based on data being retrieved from a group of patients (at least two), wherein the data of the single patients contained in the group of patients is merged to form the virtual patient. In this case, the data of the single patients contained in the group of patients can be represented equally in the virtual patient or there can be a weighting (e.g., to minimize or exclude measurement failures or statistic deviations). The virtual patient (virtual patient model) may be a partial model of the real patient(s), i.e. it may represent only a part of interest (e.g. a body portion, such as the heart, a vessel, a bone, etc.). The virtual patient (virtual patient model) is not limited to a human model but may also include an animal model.

Further, the virtual patient (virtual patient model) may be based on data being retrieved using a single technique or multiple, such as medical imaging techniques. For example, a virtual patient may be based on data, retrieved from one or more of the following: radiography, magnetic resonance imaging, molecular imaging, ultrasound imaging, elastography, photoacoustic imaging, tomography, echocardiography, near-infrared spectroscopy, magnetic particle imaging, and/or the like. Additionally, the virtual patient may include pathology data, tissue characteristics, patient meta data, and so forth.

The means for providing at least one virtual patient model may include a structure for storing at least one virtual patient model and/or to transmit data representing the virtual patient model to the system. For example, the means for providing at least one virtual patient model may be adapted to download at least one virtual patient model from a database that may be a local database or a global database, such as a cloud-based database. Further, the means for providing at least one virtual patient model may be adapted to generate a virtual patient model from data being retrieved from one or multiple patients or any intermediate data.

The system comprises further means for providing a virtual model of a medical device to be evaluated. The modelled medical device may be any medical device that is configured to be placed inside or on the surface of the body. For example, the medical device may be a medical implant for replacing body parts, delivering medication, monitoring body functions, and/or providing support to organs and tissues. The virtual model of said medical device is a computer-based simulation or model, that represents the real medical device or a set of real medical devices. Said set may represent different design options of a real medical device (e.g. sizes, shapes, . . . ).

The system comprises further means for automatically identifying a medical device location within the at least one virtual patient model and means for aligning the model of the medical device with the at least one virtual patient model at the identified device location. The means for identifying a medical device location and the means for aligning the model of the medical device with the at least one virtual patient model may be separate means or may be integrally formed. After having provided the at least one virtual patient model and the virtual model of a medical device, the means for automatically identifying a medical device location automatically identifies a medical device location. This may be achieved by one or more attributes of the virtual model of a medical device and/or the virtual patient model. For example, the virtual model of a medical device may be a virtual model of an artificial heart or a model or a heart valve. The artificial heart has to be located in the pericardium and the heart valve such as a tricuspid valve replacement has to be located between the right atrium and the right ventricle of the virtual patient model. For aligning the virtual model of the medical device with the virtual patient model, further attributes, such as corresponding landmarks, may be used.

The system comprises further means for evaluating the fit of the medical device in the at least one virtual patient model by evaluating the fit of the aligned model of the medical device within the at least one virtual patient model. Evaluating the fit of the medical device may be based on a collision detection and/or an anatomical measurements check. For collision detection, it is determined whether the virtual model of the medical device and the virtual patient model collide and/or cut each other. An anatomical-measurements check takes into account whether the virtual patient model is within the required limits of the medical device specifications, such as whether it provides sufficient space at the medical device location for receiving the medical device. For example, despite a detected collision, the medical device may still fit the virtual patient model, as the surrounding tissue is elastic enough to compensate for the collision. In a further example, no collision may be detected but the anatomical measurements check, and therefore fit evaluation, may still fail, as the medical device has to be positioned spaced apart from surrounding tissue.

The automated alignment and evaluation of the fit of a virtual model of a medical device, such as an artificial organ, within a virtual patient model brings safer and better design and validation of the real medical device that is represented by the respective virtual model. In particular, the above described system allows for population-based fit evaluation, as it is possible to evaluate a medical device (respectively a model thereof) against multiple virtual patients representing a target population and to make a fitting decision on each case out of the represented population. Automated alignment and fit evaluation further allow for evaluating a large database practically feasible in a very short time and thus to generate a statistical evaluation summary of a population.

Further, the system may be configured to visualize individual and/or statistical unfitting decisions, such as by highlighting a zone or area of the device model (e.g. a collision volume, out-of-limit anatomical measurements within the virtual patient, and/or the like). Thus, a part of the medical device which needs to be modified can be easily identified. Even further, the system may be configured to give a designs suggestion, such as a modified topology of the medical device, that overcomes the identified unfitting decisions, at least for some percentage of the evaluated number of virtual patients.

For the reasons given above, the system allows for reducing costs and time-to-market significantly and to provide an optimized design prior to clinical testing, thereby reducing or even replacing clinical trials. Further, by optimizing the design to treat the maximum number of patients, a higher population cohort becomes eligible for treatment. Additional adverse events can be reduced. Still further, medical innovation can be made more secure and can be accelerated. As development costs are reduced, also the burden of the healthcare system is minimized. Finally, clinicians are supported having a higher confidence in the so designed and optimized medical devices and sub-population selection is facilitated.

The virtual patient model may be based on image data retrieved from one real patient, or the virtual patient model may be based on image data retrieved from multiple patients. Further, the system may comprise means for automatically generating a virtual patient model, based on image data of at least one patient. The image data may be 2-dimensional image data, 3-dimensional image data, or higher-dimensional image data having, for example, a time component (or a moment of acquisition) and showing the patient in different states. For example, the data may show a patient's heart or vessel under different states, such as systolic and/or diastolic state. In a further example, the image data and therefore the virtual patient model may model growth of a patient, thus allowing to evaluate fit of a medical device under changing environments. Particularly, this allows for virtually evaluating pediatric medical devices. Further, the virtual patient model may combine image data having different dimensions to form a virtual patient model. Typical examples of imaging data are image sequences of computed tomography (CT) scans or magnetic resonance imaging (MRI) scans. Other imaging techniques may also be used for acquiring image data. Further, the automatically generated virtual patient model may include further data, such as corresponding meta data (e.g. pathology, sex, age, weight, size, . . . ).

Still further, the means for automatically generating a virtual patient model may be configured to merge image data of multiple patients to form a merged virtual patient model, wherein the data of the single patients can be represented equally in the virtual patient model or there can be a weighting, such as to minimize or exclude measurement failures or statistic deviations.

To generate a virtual patient model, an evaluation may be made of real patient data (e.g., a data set of CT or MRI scans) Each of the 2D layers of the CT scans is analyzed using a segmentation to identify anatomical structures within the respective 2D-layer. This can be done using image recognition techniques, image processing methods and/or deep neural network models. Subsequently, a 3D model of the identified anatomical structure can be generated, based on the segmented 2D-layers. The reconstructed 3D model can be described in any modern data format, such as STL, to store, for example, a triangulated surface.

The means for automatically identifying a medical device location within the at least one virtual patient model may be configured to automatically set at least one landmark at the device location, wherein each set landmark corresponds to a corresponding landmark of the model of the medical device. Further, the means for aligning the model of the medical device with the at least one virtual patient model at the identified device location may utilize the at least one set landmark and the corresponding landmark for aligning the model of the medical device with the at least one virtual patient model at the identified device location. Optionally the set landmarks and the corresponding landmarks of the model of the medical device define the position and/or orientation of the model of the medical device in the virtual patient model.

These landmarks can be defined in the 2D space or the 3D space. In case of 3D space, the corresponding 2D landmarks can be obtained via projection. Landmarks may be defined as points, lines, splines, or the like on the medical device model. The landmarks allow for defining anatomical measurements used to compare with the measurement within the virtual patient model and/or which allow for connecting landmarks of the medical device to the corresponding landmarks of the virtual patient model. In particular, there may be different landmarks for defining anatomical measurements and for aligning, i.e. to connecting landmarks of the medical device to the corresponding landmarks of the virtual patient model. The landmarks of the virtual patient model may be defined by characteristic anatomical points, such as the transition of the right atrium to the right ventricle of the virtual patient model.

After having set the landmarks on the virtual patient model and the model of the medical device, the model of the medical device can be automatically aligned with the virtual patient model, using said landmarks. Further, after having set the landmarks on the virtual patient model, anatomical measurements can be carried out, such as by measuring a distance between said landmarks.

Further, the system may comprise a means for manually correcting at least one set landmark and/or for manually setting at least one additional landmark at the device location. Depending on the newly set or corrected landmark, the virtual model of the medical device may be repositioned automatically. The newly set or corrected landmark may be stored and/or transferred to other virtual patient models automatically.

Further, the means for evaluating the fit of the medical device in the at least one virtual patient model may be configured to carry out a space collision detection between the at least one virtual patient model and the model of the medical device. Thus, a first fit evaluation can be carried out. Optionally, the space collision detection between the at least one virtual patient model and the model of the medical device may be configured in different states of the virtual patient model. Different states may be a systolic or a diastolic state. Thus, a fit evaluation of cardiac medical devices, for example, can be provided. Further optionally, the means for evaluating the fit of the medical device in the at least one virtual patient model is configured to compare a detected space collision to a predefined collision threshold, to evaluate whether the medical device fits despite a detected collision. Thus, additional findings, such as flexibility of a tissue, can be considered for the fit evaluation.

Particularly, the space collision detection is a method to test whether the virtual model of the medical device collides with the space occupied by the virtual patient model, when the virtual model of the medical device is aligned within the virtual patient model, such as by using predefined landmarks. Additionally, anatomical measurements may be performed for determining whether the device location of the virtual patient model fulfils further measurement requirements of the medical device.

Collision detection may be performed by testing vertexes of the aligned models of the virtual patient and the medical device, for example by using algorithms such as ray triangle intersection or other known equivalents. Further, a surface and/or volume of the colliding vertexes may be estimated and displayed to visualize the collision and/or to give an optimized design/topology of the modelled medical device.

Further, the means for evaluating the fit of the medical device in the at least one virtual patient model may be configured to evaluate, whether the medical device location within the at least one virtual patient model fulfills anatomical requirements, that are defined by the model of the medical device. Those anatomical requirements may be anatomical measurements. Thus, the means for evaluating the fit of the medical device in the at least one virtual patient model can be configured to take into account whether the virtual patient model is within the required limits of the medical device specifications, such as whether it provides sufficient space at the medical device location for receiving the medical device.

By using collision detection, it can be evaluated, whether a medical device can be installed in a virtual patient model. Additionally, using anatomical requirements, such as anatomical measurements, it can be evaluated whether the medical device fits correctly. Thus, fit evaluation is more precisely.

The system may further comprise a means for outputting results of a fit evaluation, carried out by the means for evaluating the fit of the medical device in the at least one virtual patient model, wherein the means for outputting optionally provides a statistic analysis of the results of a fit evaluation and even further optionally is adapted to identify and/or interpolate at least one missing data point. In particular, the means for outputting results of a fit evaluation may visualize individual and/or statistical unfitting decisions by highlighting a collision volume and/or surface and/or out-of-limit anatomical measurements within the virtual patient model or the virtual model of the medical device. Thus, design optimization of the medical device is facilitated.

The means for outputting may also allow for selecting and visualizing a fitting of a medical device in a sub-population by using predefined and/or manually defined inclusion/exclusion criteria and thus to provide a respective statistical summary of sub-population fit evaluations. Generally, an automatically generated report based on a whole and/or sub-population may be produced based on previously gathered fit evaluations. Thus, medical devices can be optimized fit to a higher population cohort.

The system may further comprise a means for determining a design modification of the medical device, in particular means for topology optimization of the medical device, that allows for improvement of the fit of the medical device in the at least one virtual patient model.

The different means of the system may be separate means or may (at least some of them) be integrally formed. The means may be carried out in software and/or hardware and may be located at one place or may be spread and connected to form the system. Particularly, the means may be connected via known wired or wireless communication techniques, including cloud-based services and/or the internet.

The object is further achieved by a method for virtually evaluating fit of a medical device in at least one virtual patient model, the method comprises the steps of:
 providing at least one virtual patient model, the virtual patient model being based on image data retrieved from at least one real patient;
 providing a virtual model of a medical device to be evaluated;
 automatically identifying a medical device location within the at least one virtual patient model;
 aligning the model of the medical device with the at least one virtual patient model at the identified device location; and
 evaluating the fit of the medical device in the at least one virtual patient model by evaluating the fit of the aligned model of the medical device within the at least one virtual patient model.

The virtual patient model may be based on image data retrieved from one real patient or may be based on image data retrieved from multiple patients. The method optionally further comprising a step of:
 automatically generating a virtual patient model, based on image data of at least one patient.

Automatically identifying a medical device location within the at least one virtual patient model may comprise automatically setting at least one landmark at the device location, wherein each set landmark may correspond to a corresponding landmark of the model of the medical device. For aligning the model of the medical device with the at least one virtual patient model at the identified device location the at least one set landmark and the corresponding landmark for aligning the model of the medical device with the at least one virtual patient model at the identified device location may be used, as described above, with respect to the inventive system. Optionally the set landmarks and the corresponding landmarks of the model of the medical device define the position and/or orientation of the model of the medical device in the virtual patient model.

The method may further comprise the step of manually correcting at least one set landmark and/or manually setting at least one additional landmark at the device location. Thus, the virtual model of the medical device may be repositioned as described above.

Evaluating the fit of the medical device in the at least one virtual patient model may include a space collision detection between the at least one virtual patient model and the model of the medical device, wherein evaluating the fit of the medical device may optionally include a space collision detection between the at least one virtual patient model and the model of the medical device in different states of the virtual patient model and/or the model of the medical device, as described above, with respect to the inventive system. Further optionally, evaluating the fit of the medical device in the at least one virtual patient model includes comparing a detected space collision to a predefined collision threshold, to evaluate, whether the medical device fits, despite a detected collision.

Evaluating the fit of the medical device in the at least one virtual patient model may include evaluating, whether the medical device location within the at least one virtual patient model fulfills anatomical requirements, such as anatomical measurements, that are defined by the model of the medical device.

The method may further comprise at least one of the following steps:
 outputting results of a fit evaluation, obtained by evaluating the fit of the medical device in the at least one virtual patient model, wherein the outputting step optionally includes a statistic analysis of the results of a fit evaluation and even further optionally is adapted to identify and/or interpolate at least one missing data point, and
 determining a design modification of the medical device, in particular a topology optimization of the medical device that allows for improvement of the fit of the medical device in the at least one virtual patient model.

This method allows for achievement of the advantages described above with respect to the inventive system. Particularly, the method may be a computer implemented method.

The objects are further achieved by a computer program, comprising instructions that when carried out by at least one processor, cause the at least one processor to perform for performing a method as described above.

Further, the objects are achieved by a non-transitory computer readable medium having stored thereon software instructions that, when carried out by at least one processor, cause the processor to perform for performing a method as described above.

Still further, the objects are achieved by system for virtually evaluating fit of a medical device in at least one patient, the system comprising at least one processor and a memory coupled with the at least one processor, wherein the at least one processor and memory are configured to perform for performing a method as described above.

BRIEF DESCRIPTION OF THE FIGURES

In the following, the accompanying figures are briefly described.

DETAILED DESCRIPTION OF THE FIGURES

Figure 1:
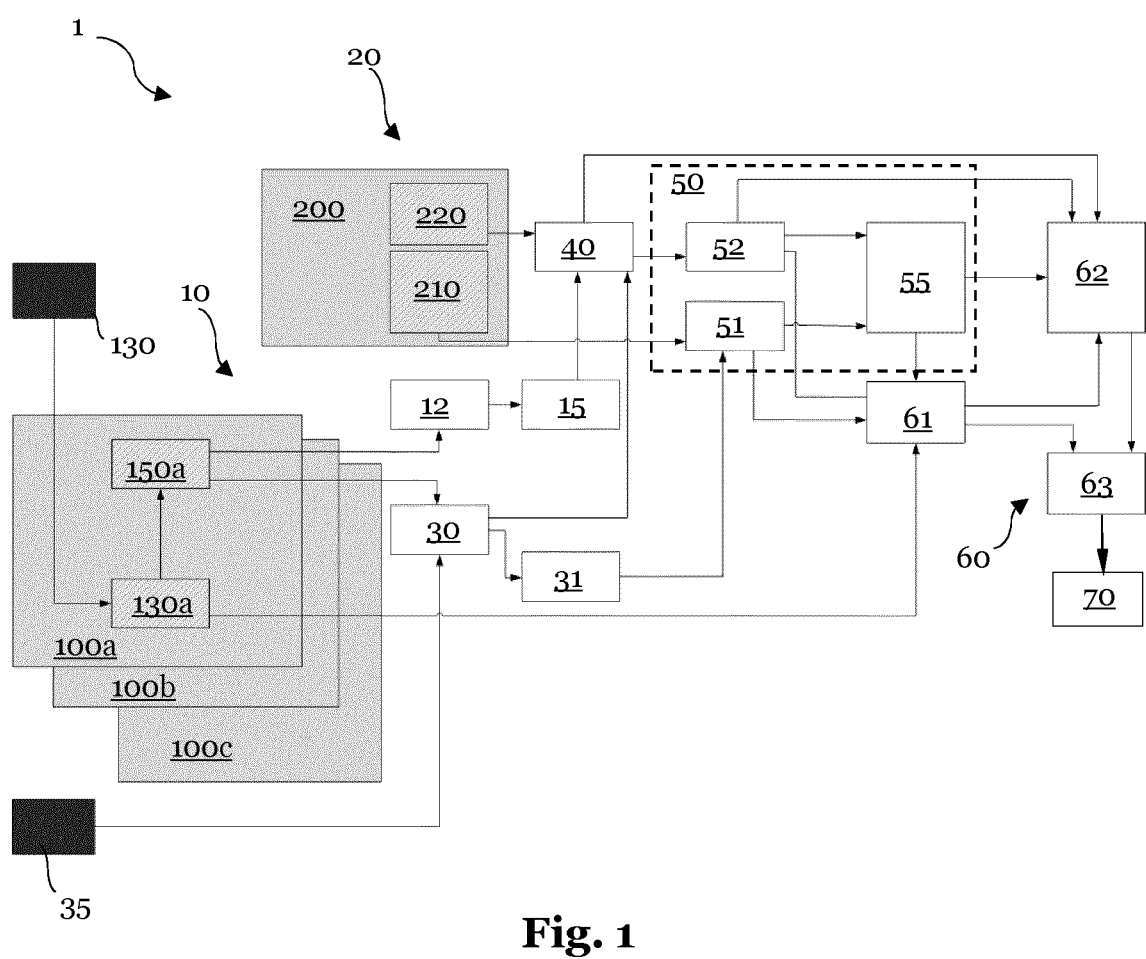
FIG. 1 schematically shows a system for virtually evaluating fit of a medical device,
 FIG. 2 schematically shows landmarks at a device location of a virtual patient model.

In particular, FIG. 1 schematically shows a system 1 for virtually evaluating fit of a medical device in at least one patient. The system comprises means 10 for providing at least one virtual patient model (not shown). The virtual patient model is based at least in part on image data 150a retrieved from at least one real patient. Further data 100a may be provided, such as corresponding meta data 130a (e.g., pathology, sex, age, weight, size, . . . ). The virtual patient model may also comprise data 100a, 100b, 100c, received from multiple patients.

The system further comprises means 20 for providing a virtual model 200 of a medical device to be evaluated. Said model may comprise landmarks 220 and/or further data, such as measurement requirements 210 of the medical device.

Further, the system 1 may comprise a means 15 for automatically generating a virtual patient model, based on data 100a, particularly image data 150a of at least one patient. To generate a virtual patient model, single 2D-layers of image data 150a may be first segmented, such as by means for image segmentation 12, and subsequently the segmented structures may be merged to form a (part of) a virtual patient model.

A means 30 for automatically identifying a medical device location within the at least one virtual patient model is provided that may automatically sets at least one landmark at the device location. Further, a means 35 for manually correcting at least one set landmark and/or for manually setting at least one additional landmark at the device location may be provided.

A means 40 for aligning the model of the medical device 200 with the at least one virtual patient model 100 at the identified device location is also provided. The aligned models may then be evaluated in a means 50 for evaluating the fit of the medical device in the at least one virtual patient model by evaluating the fit of the aligned model of the medical device 200 within the at least one virtual patient model 100.

The means 50 for evaluating the fit of the medical device in the at least one virtual patient model is configured to carry out a space collision detection, such as using a means 52, between the at least one virtual patient model 100 and the model of the medical device 200. The space collision detection may be carried out in different states of the virtual patient model 100 and/or the model of the medical device 200.

Further, the means 50 for evaluating the fit of the medical device in the at least one patient is configured to evaluate, whether the medical device location within the at least one virtual patient model 100 fulfills anatomical requirements 210, that are defined by the model of the medical device 200. This may be carried out by means 51. Previously, a means 31 for automated anatomical measurements may measure the anatomical conditions at the device location, such as by using the landmarks. For example, the distance between two landmarks may be measured automatically.

Based on the output of means 52 (space collision detection) and means 51 (anatomical requirements evaluation), a means 53 for deciding fit of the medical device may decide whether the fit evaluation is passed or not.

The system may further comprise a means 60 for outputting results of said fit evaluation, carried out by the means 50 for evaluating the fit of the medical device in the at least one virtual patient model. The means 60 for outputting results of said fit evaluation may provide a statistic analysis of the results of a fit evaluation, such as by means 61, and optionally may visualize collision and/or anatomical mismatches on the virtual patient model and/or the model of the medical device, such as by means 62. A means 63 may be provided for outputting a fit evaluation report.

Further, the system 1 may comprise a means 70 for determining a design modification of the medical device, in particular means for topology optimization of the medical device, that allows for improvement of the fit of the medical device in the at least one virtual patient model.

With system 1 of FIG. 1, a population of patient data 100a, 100b, 100c can be compared with a medical device to make automatic device fitting decisions.

The system 1 may evaluate the fit of a medical device in an individual virtual patient model. As fit evaluation and model alignment are automated, they can be applied to a high number of pf virtual patient models, that may represent a population. Accordingly, statistical fit evaluation can be performed to give an overview of the whole population. For example, the number and percentage of the population a device fits into can be evaluated. Further, a critical zone of the medical device, where most collisions occur, may be identified and optimized. This information may be visualized and helps to achieve the objects defined above.

Figure 2:
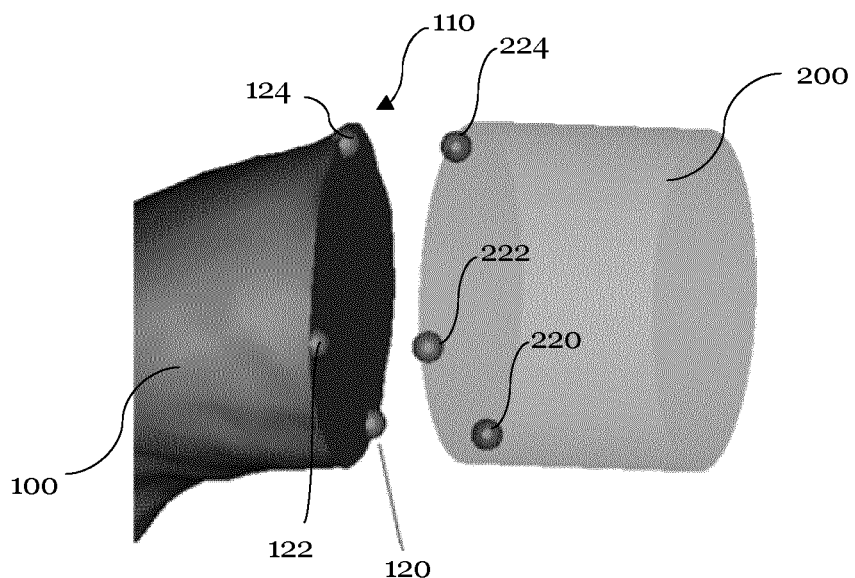
Figure 3:
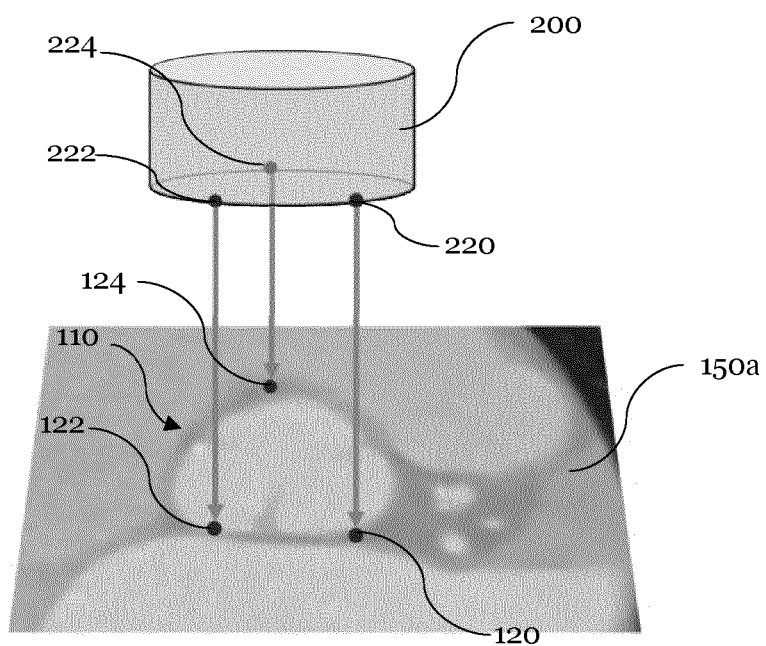
FIG. 3 schematically shows landmarks at a device location of a virtual patient model.

FIG. 2 and FIG. 3 schematically show landmarks 120, 122, 124 at a device location 110 of a virtual patient model 100 and corresponding landmarks 220, 222, 224 of a virtual model of a medical device 200. FIG. 2 shows 3D landmarks on a model of a medical device 200 and a virtual patient model 100 and FIG. 3 shows landmarks 120, 122, 124 projected on perpendicular plane on a patient CT image 150a. Those landmarks 120, 122, 124 and corresponding landmarks 220, 222, 224 serves for aligning the virtual model of the medical device 200 within the virtual patient model 100.

Figure 4:
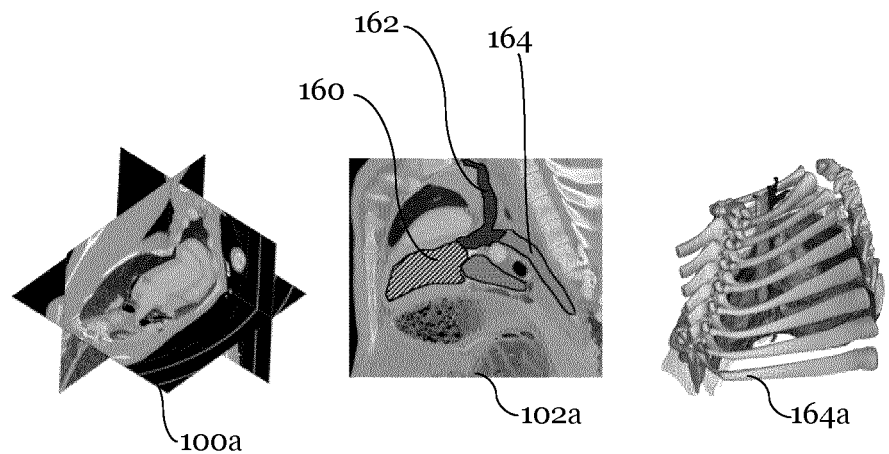
FIG. 4 schematically shows an automated generation of a virtual patient model.

FIG. 4 schematically shows an automated generation of a virtual patient model 100, as carried out, for example, by means 12, 15. From a set of data 100a of at least one real patient, such as a CT-scan or an MRT-scan, single 2D layers 102a are provided. Each of the 2D layers of the CT scan is analyzed using a segmentation to identify anatomical structures 160, 162, 164 within the respective 2D-layer, such as a rib. This can be done using image recognition techniques, image processing methods and/or deep neural network models. Subsequently, a 3D model of the identified anatomical structure 164a can be generated, based on the segmented 2D-layers. In particular a 3D or higher dimensional model may be generated by using a sequence of 2D segmented pixels and known image scan distance. The reconstructed 3D model 164a can be described in any modern data format, such as STL, to store a triangulated surface, for example, and may form at least part of the virtual patient model.

Figure 5:
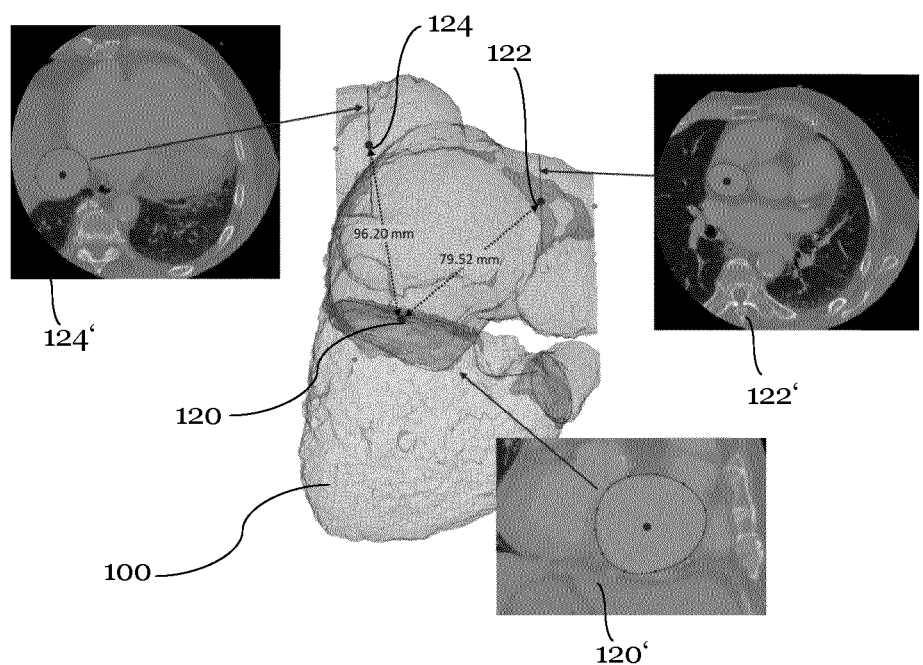
FIG. 5 schematically shows anatomical measurements using landmarks.

FIG. 5 schematically shows anatomical measurements using landmarks 120, 122, 124. For anatomical measurements at first landmarks are set automatically and/or manually. Preferably the landmarks are set in segmented 2D layers 120', 122', 124' of a patient's data set. The landmarks 120, 122, 124 can then be transferred to a virtual patient model 100. Subsequently, distances between the landmarks or other anatomical measurements can be carried out. FIG.

5 illustrates an example of how to measure the distance between different vessels of the heart.

When it comes to evaluating and deciding whether a medical device or a respective model 200 thereof fits into a virtual patient model 100, for example, the following two conditions can be verified: Firstly, there should be no collision of the properly positioned device model 200 within virtual patient model 100. Secondly, all the anatomical measurements of a virtual patient model 100 should be within the required limits of the device specifications.

Figure 6:
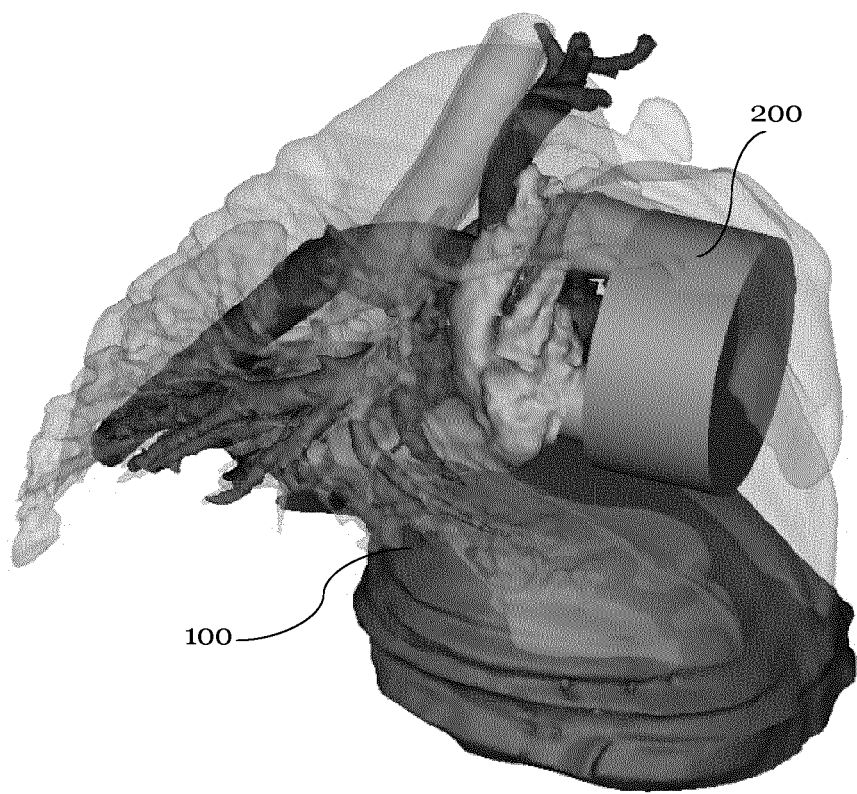
FIG. 6 schematically shows automated alignment of a device model within a virtual patient model.

Before evaluating and deciding whether a medical device or a respective model 200 thereof collides with a virtual patient model 100, the virtual model of the medical device 200 needs to be positioned as if a real test device is installed properly within a real body, i.e. the virtual model of the medical device 200 is aligned in the virtual patient model, by using landmarks, for example, as shown in FIG. 6.

By using the landmarks (cf. e.g. FIG. 2, 3), annotated on the device model 200 and the automatically detected landmarks on the virtual patient model 100, system 1 can automatically (re) position/align the device model 200 to a target device location 110 within the virtual patient model 100.

Figure 7:
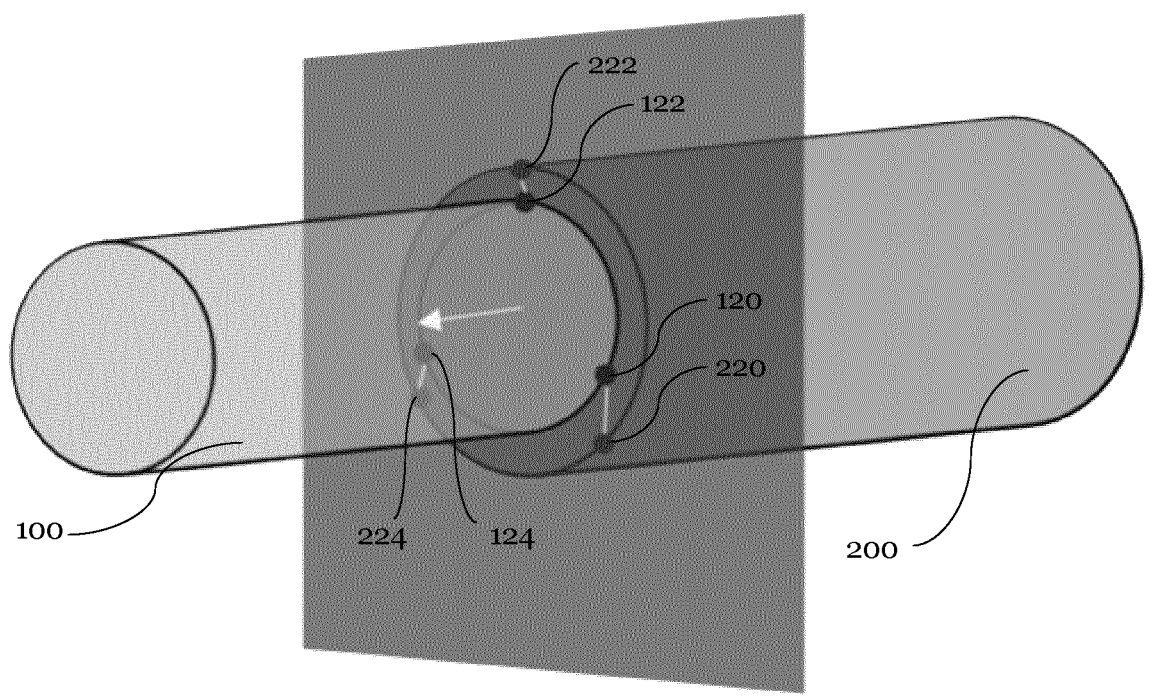
FIG. 7 schematically shows automated collision detection between a device model and a virtual patient model, and FIG. 8 schematically shows a flow diagram of a method for virtually evaluating fit of a medical device.

FIG. 7 schematically shows automated collision detection between a device model 200 and a virtual patient model 100. Collision between a device model 200 and a virtual patient model 100 may be detected by testing whether vertexes of the aligned device model 200 is within the virtual patient model 100, by algorithms, for example, such as ray triangle intersection or other equivalents.

Further surface and volume constituted by collided vertexes can be determined to display a collision. Particularly, a threshold can be set to decide whether a device model 200 fits. While collision detection makes sure that a device can be installed in the virtual patient model 100, anatomical measurements may be further key aspects to confirm that the device will fit correctly. The anatomical measurements required by a medical device a typically provided by the manufacturers of the medical device, according to their know-how of the device.

Figure 8:
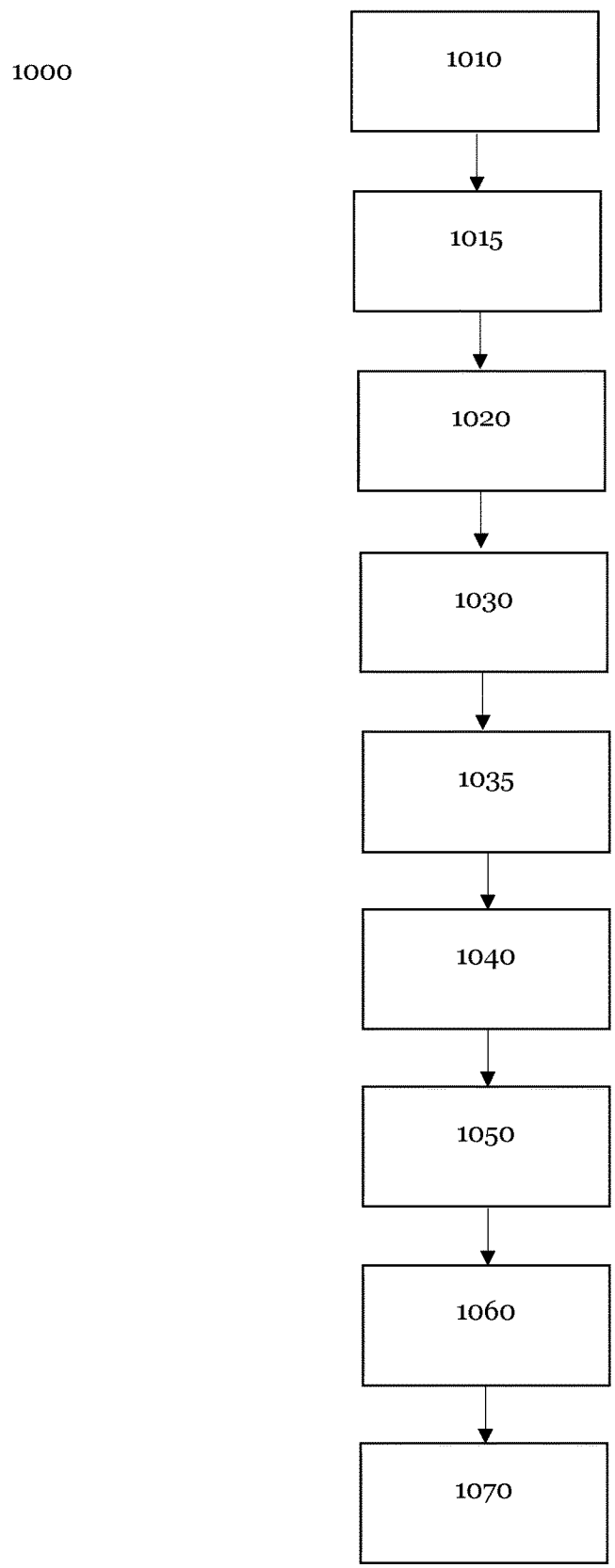

FIG. 8 schematically shows a flow diagram of a method 1000 for virtually evaluating fit of a medical device. The method comprises the steps of providing 1010 at least one virtual patient model and optionally automatically generating 1015 a virtual patient model. Further, the method comprises the step of providing 1020 a virtual model of a medical device and of automatically identifying 1030 a medical device location. Said device location may be defined by landmarks that may be optionally manually corrected in step 1035. In step 1040 the model of the medical device and the virtual patient model are aligned. Subsequently, in step 1050 fit of the device model is evaluated. In step 1060 results of the fit evaluation may be outputted and in step 1070 it a design modification may be determined.

LIST OF REFERENCE SIGNS 1 system
10 means for providing at least one virtual patient model
12 means for image segmentation
15 means for automatically generating a virtual patient model
20 means for providing a virtual model of a medical device
30 means for automatically identifying a medical device location
31 means for automated anatomical measurements
35 means for manually correcting at least one set landmark
40 means for aligning
50 means for evaluating the fit
51 means for anatomical measurements comparison
52 means for collision detection
55 means for fit decision
60 means for outputting results of a fit evaluation
61 means for statistical summary
62 means for mismatch visualization
63 means for report generation
70 means for determining a design modification
100 virtual patient model
100a patient data
100b patient data
100c patient data
110 device location
120 landmark
122 landmark
124 landmark
130 metadata selection
130a metadata
150a image data
160, 162, 164 anatomical structure
200 virtual model of a medical device
210 anatomical measurements requirements
220 landmark
222 landmark
224 landmark
1000 method
1010 providing at least one virtual patient model
1015 automatically generating a virtual patient model
1020 providing a virtual model of a medical device
1030 automatically identifying a medical device location
1035 manually correcting at least one set landmark
1040 aligning
1050 evaluating the fit
1060 outputting results of a fit evaluation
1070 determining a design modification In the following, further embodiments are described to facilitate the understanding of the invention:

Embodiment 1: A system (1) for virtually evaluating fit of a medical device in at least one patient, the system comprising:

means (10) for providing at least one virtual patient model (100), the virtual patient model being based at least in part on image data retrieved from at least one real patient;

means (20) for providing a virtual model of a medical device (200) to be evaluated;

means (30) for automatically identifying a medical device location (110) within the at least one virtual patient model (100);

means (40) for aligning the model of the medical device (200) with the at least one virtual patient model (100) at the identified device location (110); and means (50) for evaluating the fit of the medical device in the at least one virtual patient model by evaluating the fit of the aligned model of the medical device (200) within the at least one virtual patient model (100).

Embodiment 2: The system (1) of Embodiment 1, wherein the virtual patient model (100) is based on image data retrieved from one real patient, or wherein the virtual patient model is based on image data retrieved from multiple patients, the system (1) optionally further comprising:

a means (15) for automatically generating a virtual patient model (100), based on image data of at least one patient.

Embodiment 3: The system (1) of any preceding Embodiment, wherein the means (30) for automatically identifying a medical device location (110) within the at least one virtual patient model (100) is configured to
- automatically set at least one landmark (120, 122, 124) at the device location, wherein
  - each set landmark (120, 122, 124) corresponds to a corresponding landmark (220, 222, 224) of the model of the medical device (200), wherein the means (40) for aligning the model of the medical device (200) with the at least one virtual patient model (100) at the identified device location (110) utilizes the at least one set landmark and the corresponding landmark (220, 222, 224) for aligning the model of the medical device (200) with the at least one virtual patient model (100) at the identified device location (110), wherein
  - optionally the set landmarks (120, 122, 124) and the corresponding landmarks (220, 222, 224) of the model of the medical device (200) define the position and/or orientation of the model of the medical device (200) in the virtual patient model (100).

Embodiment 4: The system (1) of Embodiment 3, further comprising
- a means (35) for manually correcting at least one set landmark (120, 122, 124) and/or for manually setting at least one additional landmark at the device location.

Embodiment 5: The system (1) of any preceding Embodiment, wherein
- the means (50) for evaluating the fit of the medical device in the at least one virtual patient model is configured to carry out a space collision detection between the at least one virtual patient model (100) and the model of the medical device (200), wherein
- the means (50) for evaluating the fit of the medical device in the at least one virtual patient model is optionally configured to carry out a space collision detection between the at least one virtual patient model (100) and the model of the medical device (200) in different states of the virtual patient model (100) and/or the model of the medical device (200), and wherein further optionally,
- the means (50) for evaluating the fit of the medical device in the at least one virtual patient model is configured to compare a detected space collision to a predefined collision threshold, to evaluate, whether the medical device (200) fits, despite a detected collision.

Embodiment 6: The system (1) of any preceding Embodiment, wherein
- the means (50) for evaluating the fit of the medical device in the at least one patient is configured to evaluate, whether the medical device location (110) within the at least one virtual patient model (100) fulfills anatomical requirements, that are defined by the model of the medical device (200).

Embodiment 7: The system (1) of any preceding Embodiment, further comprising at least one of the following means:
- a means (60) for outputting results of a fit evaluation, carried out by the means (50) for evaluating the fit of the medical device in the at least one virtual patient model, wherein the means (60) for outputting optionally provides a statistic analysis of the results of a fit evaluation and even further optionally is adapted to identify and/or interpolate at least one missing data point, and
- a means (70) for determining a design modification of the medical device, in particular means for topology optimization of the medical device, that allows for improvement of the fit of the medical device in the at least one virtual patient model.

Embodiment 8: A method (1000) for virtually evaluating fit of a medical device in at least one virtual patient model, the method comprises the steps of:
- providing (1010) at least one virtual patient model (100), the virtual patient model being based on image data retrieved from at least one real patient;
- providing (1020) a virtual model of a medical device (200) to be evaluated;
- automatically identifying (1030) a medical device location (110) within the at least one virtual patient model (100);
- aligning (1040) the model of the medical device (200) with the at least one virtual patient model (100) at the identified device location (110); and
- evaluating (1050) the fit of the medical device in the at least one virtual patient model by evaluating the fit of the aligned model of the medical device (200) within the at least one virtual patient model (100).

Embodiment 9: The method (1000) of Embodiment 8, wherein the virtual patient model (100) is based on image data retrieved from one real patient, or wherein the virtual patient model is based on image data retrieved from multiple patients, the method (1000) optionally further comprising a step of:
- automatically generating (1015) a virtual patient model (100), based on image data of at least one patient.

Embodiment 10: The method (1000) of any preceding method Embodiment, wherein automatically identifying (1030) a medical device location (110) within the at least one virtual patient model (100) comprises
- automatically setting at least one landmark (120, 122, 124) at the device location, wherein
  - each set landmark (120, 122, 124) corresponds to a corresponding landmark (220, 222, 224) of the model of the medical device (200), wherein for aligning (1040) the model of the medical device (200) with the at least one virtual patient model (100) at the identified device location (110) the at least one set landmark (120, 122, 124) and the corresponding landmark (220, 222, 224) for aligning the model of the medical device (200) with the at least one virtual patient model (100) at the identified device location (110) is used, wherein
  - optionally the set landmarks (120, 122, 124) and the corresponding landmarks (220, 222, 224) of the model of the medical device (200) define the position and/or orientation of the model of the medical device (200) in the virtual patient model (100).

Embodiment 11: The method (1000) of Embodiment 10, further comprising
- manually correcting (1035) at least one set landmark (120, 122, 124) and/or manually setting at least one additional landmark at the device location.

Embodiment 12: The method (1000) of any preceding Embodiment relating to a method, wherein
- evaluating (1050) the fit of the medical device in the at least one virtual patient model includes a space collision detection between the at least one virtual patient model (100) and the model of the medical device (200), wherein evaluating (1050) the fit of the medical device is optionally includes a space collision detection between the at least one virtual patient model (100) and the model of the medical device (200) in different states of the virtual patient model (100) and/or the model of the medical device (200), and wherein further optionally, the evaluating (1050) the fit of the medical device in the at least one virtual patient model includes comparing a detected space collision to a predefined collision threshold, to evaluate, whether the medical device (200) fits, despite a detected collision.

Embodiment 13: The method (1000) of any preceding Embodiment relating to a method, wherein evaluating (1050) the fit of the medical device in the at least one virtual patient model includes evaluating, whether the medical device location (110) within the at least one virtual patient model (100) fulfills anatomical requirements, that are defined by the model of the medical device (200).

Embodiment 14: The method (1000) of any preceding Embodiment relating to a method, further comprising at least one of the following steps:

outputting (1060) results of a fit evaluation, obtained by evaluating (1050) the fit of the medical device in the at least one virtual patient model, wherein the outputting step (1060) optionally includes a statistic analysis of the results of a fit evaluation and even further optionally is adapted to identify and/or interpolate at least one missing data point, and determining (1070) a design modification of the medical device, in particular a topology optimization of the medical device, that allows for improvement of the fit of the medical device in the at least one virtual patient model.

Embodiment 15: Computer program, comprising instructions that when carried out by at least one processor, cause the at least one processor to perform for performing a method accruing to any one of Embodiments 8 to 14.

Embodiment 16: A non-transitory computer readable medium having stored thereon software instructions that, when carried out by at least one processor, cause the processor to perform for performing a method accruing to any one of Embodiments 8 to 14.

Embodiment 17: A system (1) for virtually evaluating fit of a medical device in at least one patient, the system comprising at least one processor and a memory coupled with the at least one processor; the at least one processor and memory configured to provide at least one virtual patient model (100), the virtual patient model being based on image data retrieved from at least one real patient;

provide a virtual model of a medical device (200) to be evaluated;

automatically identify a medical device location (110) within the at least one virtual patient model (100);

align the model of the medical device (200) with the at least one virtual patient model (100) at the identified device location (110); and evaluate the fit of the medical device in the at least one virtual patient model by evaluating the fit of the aligned model of the medical device (200) within the at least one virtual patient model (100).

Embodiment 18: The system of Embodiment 17, wherein the virtual patient model (100) is based on image data retrieved from one real patient, or wherein the virtual patient model is based on image data retrieved from multiple patients, the at least one processor and memory optionally further configured to automatically generate a virtual patient model (100), based on image data of at least one patient.

Embodiment 19: The system of any one of Embodiments 17 or 18, wherein the at least one processor and memory are configured to automatically identify (1030) a medical device location (110) within the at least one virtual patient model (100) and wherein said automatically identifying comprises automatically setting at least one landmark (120, 122, 124) at the device location, wherein each set landmark (120, 122, 124) corresponds to a corresponding landmark (220, 222, 224) of the model of the medical device (200), wherein for aligning (1040) the model of the medical device (200) with the at least one virtual patient model (100) at the identified device location (110) the at least one set landmark (120, 122, 124) and the corresponding landmark (220, 222, 224) for aligning the model of the medical device (200) with the at least one virtual patient model (100) at the identified device location (110) is used, wherein optionally the set landmarks (120, 122, 124) and the corresponding landmarks (220, 222, 224) of the model of the medical device (200) define the position and/or orientation of the model of the medical device (200) in the virtual patient model (100).

Embodiment 20: The system of Embodiment 19, wherein the at least one processor and memory are further configured to manually correct at least one set landmark (120, 122, 124) and/or manually set at least one additional landmark at the device location.

Embodiment 21: The system of any one of Embodiments 17 to 20, wherein the at least one processor and memory are further configured to evaluate the fit of the medical device in the at least one virtual patient model and wherein said evaluating includes a space collision detection between the at least one virtual patient model (100) and the model of the medical device (200), wherein said evaluating the fit of the medical device optionally includes a space collision detection between the at least one virtual patient model (100) and the model of the medical device (200) in different states of the virtual patient model (100) and/or the model of the medical device (200), and wherein further optionally, said evaluating the fit of the medical device in the at least one virtual patient model includes comparing a detected space collision to a predefined collision threshold, to evaluate, whether the medical device (200) fits, despite a detected collision.

Embodiment 22: The system of any one of Embodiments 17 to 21, wherein evaluating the fit of the medical device in the at least one virtual patient model includes evaluating, whether the medical device location (110) within the at least one virtual patient model (100) fulfills anatomical requirements, that are defined by the model of the medical device (200).

Embodiment 23: The system of any one of Embodiments 17 to 22, wherein the at least one processor and memory are further configured to at least one of the following:

outputting results of a fit evaluation, obtained by evaluating the fit of the medical device in the at least one virtual patient model, wherein the outputting step optionally includes a statistic analysis of the results of a fit evaluation and even further optionally is adapted to identify and/or interpolate at least one missing data point, and determining a design modification of the medical device, in particular a topology optimization of the medical device, that allows for improvement of the fit of the medical device in the at least one virtual patient model.

The invention claimed is:

1. A system for virtually evaluating fit of a medical device in at least one patient, the system comprising:
   means for providing at least one virtual patient model, the virtual patient model being based at least in part on image data retrieved from multiple real patients;
   means for providing a virtual model of a medical device to be evaluated;
   means for automatically identifying a medical device location within the at least one virtual patient model;
   means for aligning the model of the medical device with the at least one virtual patient model at the identified device location; and
   means for evaluating the fit of the medical device in the at least one virtual patient model by evaluating the fit of the aligned model of the medical device within the at least one virtual patient model,
   wherein the means for automatically identifying a medical device location within the at least one virtual patient model is configured to:
   automatically set at least one landmark at the device location,
      wherein each set landmark corresponds to a corresponding landmark of the model of the medical device, wherein the means for aligning the model of the medical device with the at least one virtual patient model at the identified device location utilizes the at least one set landmark and the corresponding landmark for aligning the model of the medical device with the at least one virtual patient model at the identified device location.

2. The system of claim 1, further comprising:
   a means for automatically generating a virtual patient model, based on image data of multiple patients.

3. The system of claim 1, wherein optionally the set landmarks and the corresponding landmarks of the model of the medical device define the position and/or orientation of the model of the medical device in the virtual patient model.

4. The system of claim 3, further comprising
   a means for manually correcting at least one set landmark and/or for manually setting at least one additional landmark at the device location.

5. The system of claim 1, wherein
   the means for evaluating the fit of the medical device in the at least one virtual patient model is configured to carry out a space collision detection between the at least one virtual patient model and the model of the medical device, wherein
   the means for evaluating the fit of the medical device in the at least one virtual patient model is optionally configured to carry out a space collision detection between the at least one virtual patient model and the model of the medical device in different states of the virtual patient model and/or the model of the medical device, and wherein further optionally,
   the means for evaluating the fit of the medical device in the at least one virtual patient model is configured to compare a detected space collision to a predefined collision threshold, to evaluate, whether the medical device fits, despite a detected collision.

6. The system of claim 1, wherein
   the means for evaluating the fit of the medical device in the at least one patient is configured to evaluate, whether the medical device location within the at least one virtual patient model fulfills anatomical requirements, that are defined by the model of the medical device.

7. The system of claim 1, further comprising at least one of the following means:
   a means for outputting results of a fit evaluation, carried out by the means for evaluating the fit of the medical device in the at least one virtual patient model, wherein the means for outputting optionally provides a statistic analysis of the results of a fit evaluation and even further optionally is adapted to identify and/or interpolate at least one missing data point, and
   a means for determining a design modification of the medical device, in particular means for topology optimization of the medical device, that allows for improvement of the fit of the medical device in the at least one virtual patient model.

8. A method for virtually evaluating fit of a medical device in at least one virtual patient model, the method comprises the steps of:
   providing at least one virtual patient model, the virtual patient model being based on image data retrieved from multiple real patients;
   providing a virtual model of a medical device to be evaluated;
   automatically identifying a medical device location within the at least one virtual patient model;
   aligning the model of the medical device with the at least one virtual patient model at the identified device location; and
   evaluating the fit of the medical device in the at least one virtual patient model by evaluating the fit of the aligned model of the medical device within the at least one virtual patient model,
   wherein automatically identifying a medical device location within the at least one virtual patient model comprises:
   automatically setting at least one landmark at the device location,
      wherein each set landmark corresponds to a corresponding landmark of the model of the medical device, wherein for aligning the model of the medical device with the at least one virtual patient model at the identified device location the at least one set landmark and the corresponding landmark for aligning the model of the medical device with the at least one virtual patient model at the identified device location is used.

9. The method of claim 8, the method further comprising a step of:
   automatically generating a virtual patient model, based on image data of multiple patients.

10. The method of claim 8, wherein optionally the set landmarks and the corresponding landmarks of the model of the medical device define the position and/or orientation of the model of the medical device in the virtual patient model.

11. The method of claim 10, further comprising
   manually correcting at least one set landmark and/or manually setting at least one additional landmark at the device location.

12. The method of claim 8, wherein
   evaluating the fit of the medical device in the at least one virtual patient model includes a space collision detection between the at least one virtual patient model and the model of the medical device, wherein evaluating the fit of the medical device is optionally includes a space collision detection between the at least one virtual patient model and the model of the medical device in different states of the virtual patient model and/or the model of the medical device, and wherein further optionally, the evaluating the fit of the medical device in the at least one virtual patient model includes comparing a detected space collision to a predefined collision threshold, to evaluate, whether the medical device fits, despite a detected collision.

13. The method of claim 8, wherein evaluating the fit of the medical device in the at least one virtual patient model includes evaluating, whether the medical device location within the at least one virtual patient model fulfills anatomical requirements, that are defined by the model of the medical device.

14. The method of claim 8, further comprising at least one of the following steps:

outputting results of a fit evaluation, obtained by evaluating the fit of the medical device in the at least one virtual patient model, wherein the outputting step optionally includes a statistic analysis of the results of a fit evaluation and even further optionally is adapted to identify and/or interpolate at least one missing data point, and determining a design modification of the medical device, in particular a topology optimization of the medical device, that allows for improvement of the fit of the medical device in the at least one virtual patient model.

15. A non-transitory computer readable medium having stored thereon instructions that when executed by at least one processor, cause the at least one processor to:

provide at least one virtual patient model, the virtual patient model being based on image data retrieved from multiple real patients;

provide a virtual model of a medical device to be evaluated;

automatically identify a medical device location within the at least one virtual patient model;

align the model of the medical device with the at least one virtual patient model at the identified device location; and evaluate the fit of the medical device in the at least one virtual patient model by evaluating the fit of the aligned model of the medical device within the at least one virtual patient model, wherein automatically identifying a medical device location within the at least one virtual patient model comprises:

automatically setting at least one landmark at the device location, wherein each set landmark corresponds to a corresponding landmark of the model of the medical device, wherein for aligning the model of the medical device with the at least one virtual patient model at the identified device location the at least one set landmark and the corresponding landmark for aligning the model of the medical device with the at least one virtual patient model at the identified device location is used.

* * * * *